(12) United States Patent
Allora (10) Patent No.: US 6,792,983 B2
(45) Date of Patent: Sep. 21, 2004

(54) SYSTEM FOR RECOVERY AND REFILLING OF COOKING OIL

(75) Inventor: Michael Allora, New Vernon, NJ (US)

(73) Assignee: Oilmatic, LLC, Newark, NJ (US)

( * ) Notice: Subject to any disclaimer, the term of this patent is extended or adjusted under 35 U.S.C. 154(b) by 23 days.

(21) Appl. No.: 10/122,620

(22) Filed: Apr. 15, 2002

(65) Prior Publication Data

US 2003/0192621 A1 Oct. 16, 2003

(51) Int. Cl.$^7$ .................................................. A47J 37/12
(52) U.S. Cl. ........................ 141/98; 141/2; 141/18; 141/82; 99/403
(58) Field of Search ........................ 141/1, 2, 18, 82, 141/94, 98, 100, 231; 99/403; 5/408

(56) References Cited

U.S. PATENT DOCUMENTS

| | | |
|---|---|---|
| 3,384,132 A | 5/1968 | Lisciani |
| 3,581,896 A | 6/1971 | Kuhlman |
| 3,735,693 A | 5/1973 | Pelster et al. |
| 4,064,796 A | 12/1977 | Jones |
| 4,068,571 A | 1/1978 | Cunningham |
| 4,210,123 A | 7/1980 | Moore et al. |
| 4,324,173 A | 4/1982 | Moore et al. |
| 4,328,097 A | 5/1982 | Whaley et al. |
| 4,360,046 A | 11/1982 | Streit et al. |
| 4,462,915 A | 7/1984 | Friedman |
| 4,489,647 A | 12/1984 | Stamps et al. |
| 4,578,196 A | 3/1986 | Friedman |
| 4,643,824 A | 2/1987 | Akazawa et al. |
| 4,646,793 A | 3/1987 | Sherratt |
| 4,702,827 A | 10/1987 | Wenzel |
| 4,805,525 A | 2/1989 | Bivens |
| 4,884,600 A | 12/1989 | Wilson |
| 4,959,144 A | 9/1990 | Bernard et al. |
| 4,962,698 A | 10/1990 | Driftholt et al. |
| 5,049,264 A | 9/1991 | Rosnack et al. |
| RE33,945 E | 6/1992 | Beaty |
| 5,179,891 A | 1/1993 | Chiu |
| 5,249,511 A | 10/1993 | Shumate et al. |
| RE34,636 E | 6/1994 | Bivens |
| 5,340,471 A | 8/1994 | Wilson et al. |
| 5,349,992 A | 9/1994 | Gallo et al. |
| 5,486,370 A | 1/1996 | Bivens |
| 5,535,849 A * | 7/1996 | Few ........................... 184/1.5 |
| 5,582,093 A | 12/1996 | Amitrano et al. |
| 5,595,107 A | 1/1997 | Bivens |
| 5,597,601 A | 1/1997 | Griffin |
| 5,617,777 A | 4/1997 | Davis et al. |
| 5,727,608 A | 3/1998 | Nusbaumer et al. |
| 5,731,024 A | 3/1998 | Bivens |
| 5,776,530 A | 7/1998 | Davis et al. |
| 5,782,171 A | 7/1998 | Crain et al. |
| 5,823,097 A | 10/1998 | Dirck |
| 5,839,360 A | 11/1998 | Williams |
| 5,870,945 A | 2/1999 | Bivens |
| 5,927,350 A | 7/1999 | Kissinger, Jr. |
| 5,944,069 A | 8/1999 | Nusbaumer et al. |
| 5,964,258 A | 10/1999 | Schoenbauer |
| 6,029,718 A | 2/2000 | Jackson et al. |
| 6,041,802 A | 3/2000 | Nelson |
| 6,056,024 A | 5/2000 | Noah et al. |
| 6,085,641 A | 7/2000 | De'Longhi |
| 6,235,193 B1 | 5/2001 | Zappe |
| 6,306,294 B1 | 10/2001 | Blair |
| 6,330,852 B1 | 12/2001 | Williams |

* cited by examiner

Primary Examiner—Steven O. Douglas
Assistant Examiner—Peter deVore
(74) Attorney, Agent, or Firm—Lerner, David, Littenberg, Krumholz & Mentlik, LLP (57) ABSTRACT

A nozzle for draining and filling liquids has a line for used liquid and a separate line for fresh liquid. A system and a method of draining and filling a cooking apparatus are disclosed.

41 Claims, 9 Drawing Sheets

SYSTEM FOR RECOVERY AND REFILLING OF COOKING OIL

FIELD OF THE INVENTION

The invention relates to systems for filling and refilling liquids in cooking apparatus and more particularly to systems for recovery of used cooking oil and refilling of fresh cooking oil in a cooking apparatus.

BACKGROUND OF THE INVENTION

A large amount of cooking oil is used in the restaurant business. For example, food fryers use a bath of hot oil for deep frying various foods, such as french fries, chicken, and other foods. It is desirable to reuse such cooking oil for only a predetermined amount of time and to change the cooking oil periodically. The cooking oil used in the deep fryers is hot and remains hot for some period of time so that removal of the used cooking oil can be dangerous.

In one known system, the cooking oil is drained into a portable vat and stored until removed by a oil handling service. In the use of the portable vat, the cooking oil may be spilled, and restaurant personnel may be injured by the hot oil or by slipping on the spilled cooking oil. Restaurant personnel handling the vat must be strong enough to carry or roll the vat and may become injured in doing so.

In another known system, a used cooking oil tank and fresh cooking oil tank are located on the premises. An appropriate hose for draining used oil from the fryer and refilling the fryer with fresh oil is stored somewhere in the restaurant. The hose is removed from storage and connected to the food fryer at one end and connected to the used oil tank at the other end. The used oil is conveyed from the food fryer to the used oil tank, through the hose. The hose is then connected to the fresh oil tank and the food fryer is replenished with cooking oil from the fresh oil tank. This system requires the connection and disconnection of a hose with the food fryer and requires plural tanks, as well as moving the hose to and from a storage location. The oil tends to drip from the ends of the hose. This presents a risk of injury to restaurant personnel from burns, slipping on spilled cooking oil, or tripping over the hose. Furthermore, the system is cumbersome and wastes time.

Further improvements in the systems for recovery and refilling of liquids in cooking apparatus are desired.

SUMMARY OF THE INVENTION

In one aspect of the present invention, a nozzle for draining and refilling liquid for a cooking apparatus comprises a housing, a fresh liquid line carried by the housing and a used liquid line carried by the housing. The fresh liquid line has an outlet for dispensing fresh liquid and the used oil line has an inlet for receiving used liquid. The fresh liquid line and separate used liquid line avoids contaminating the fresh liquid with the used liquid drained from the apparatus.

The nozzle desirably includes at least one actuator carried by the housing for actuating at least one pump. The at least one actuator may comprise at least one switch for actuating the at least one pump. The fresh liquid line and the used liquid line may comprise flexible tubing for communicating liquid with at least one pump. The wiring and flexible tubing may extend from the back end of the housing. A tube is desirably attached to the back end of the housing so that the wiring, fresh liquid line, and the used liquid line extends through the tube.

In a preferred embodiment, the at least one actuator comprises a first switch for actuating a first pump and a second switch for actuating a second pump. In a preferred embodiment, the nozzle includes a selector knob for selecting the first switch or the second switch and a button for actuating either the first switch or the second switch. Separate pumps are desirably used in draining and refilling the apparatus using the nozzle. The first pump for the fresh liquid and the separate second pump for the used liquid further ensures that the fresh liquid is maintained separately from the used liquid drained from the apparatus.

In a preferred embodiment, the nozzle has an inlet tube connected to the used liquid line and an outlet tube connected to the fresh liquid line. The used liquid line and the fresh line desirably comprise flexible tubes, whereas the inlet tube and outlet tube desirably comprise rigid tubing. The inlet tube may include an end cap connected to a free end of the inlet tube. The end cap preferably carries a screen. The outlet tube may include a shut-off valve connected to a free end of the outlet tube. The shut-off valve desirably comprises a check valve that operates automatically to stop the flow of fresh liquid from the outlet tube. The inlet tube is used for draining liquid from the apparatus and the outlet tube is used for refilling the apparatus with fresh liquid. In the preferred embodiment, the apparatus comprises a cooking apparatus and the liquid drained and refilled comprises cooking oil. The inlet tube and the used liquid line desirably comprise a material for conveying hot cooking oil and for withstanding temperatures of cooking oil used in the cooking apparatus. The outlet tube and the fresh liquid oil desirably comprise food grade material, as where the apparatus compresses a cooking apparatus. The inlet tube and the outlet tube may comprise stainless steel tubes, whereas the fresh liquid line and used liquid line may comprise silicone tubes.

In a further aspect of the invention, a system for draining used liquid and refilling fresh liquid for a cooking apparatus comprises a cooking apparatus, a fresh liquid tank, a used liquid tank, at least one pump for delivering fresh liquid to the cooking apparatus and draining used liquid from the cooking apparatus, a nozzle having a fresh liquid line and a used liquid line, and piping connecting the fresh liquid tank, the used liquid tank, the at least one pump and the nozzle. The nozzle is utilized in draining the liquid from the cooking apparatus and conveying the liquid to the used liquid tank. The nozzle is then used for delivering fresh liquid from the fresh liquid tank and conveying the fresh liquid to the cooking apparatus. At least one pump conveys the liquid between the cooking apparatus and the tanks via the nozzle. Piping connects the nozzle to the tanks through the pumps. The nozzle is a separate hand-held apparatus that is conveniently stored on the premises for the cooking apparatus.

In a preferred arrangement, a fill box is included in the system and has at least one port for communicating from an exterior side in the building in which the cooking apparatus is located to the interior side of the building. The fill box may include a first port connected to the used liquid tank and a second port connected to the fresh liquid tank. The fill box enables the used liquid tank to be drained from outside the building and enables the fresh liquid tank to be refilled from outside the building. For example, in certain embodiments, the cooking apparatus is located within a restaurant and a service company gains access to the tank through the fill box so that used cooking oil is drained from the used liquid tank and fresh cooking oil is delivered to the fresh liquid tank.

In certain embodiments, the at least one pump comprises a used liquid pump having an outlet in communication with the used liquid tank and a fresh liquid pump having an inlet in communication with the fresh liquid tank. The nozzle is connected to the used liquid pump and the fresh liquid pump.

The piping for connecting the nozzle with the tanks through the at least one pump preferably includes a material suitable for conveying hot cooking oil. The piping also desirably includes, where appropriate, food grade materials.

A control box is desirably connected to the at least one pump for actuating the at least one pump in draining and refilling the cooking apparatus. The control box may be connected to the at least one pump through wiring.

The nozzle preferably includes an actuator connected to the at least one pump for draining and refilling the cooking apparatus. The actuator may be connected to the at least one pump through wiring.

In certain preferred embodiments, the actuator comprises a first switch in communication with the fresh liquid pump and a second switch in communication with the used liquid pump. The actuator may comprise at least one switch for actuating a fresh liquid pump and a used liquid pump. The at least one pump may be actuated through an electronic component having a different arrangement. Any known type of switch may be used and any known type of communication system may be used to actuate the at least one pump. For example, the nozzle and/or control box actuators may communicate with the pumps wirelessly.

In a further aspect of the present invention, a method of draining and refilling liquids in a cooking apparatus comprises inserting an inlet of a nozzle into the cooking apparatus, actuating a used liquid pump in communication with the nozzle, actuating a fresh liquid pump in communication with the nozzle, directing fresh liquid to the cooking apparatus. The nozzle is used in both draining and refilling the cooking apparatus. There is no need to connect and disconnect temporary tubing to the cooking apparatus, which must be stored after the draining and refilling of the cooking apparatus.

Desirably, the method includes selecting between a draining mode and a refilling mode for the nozzle. The selecting may comprise selecting between actuation of a used liquid pump and a fresh liquid pump. The method may include refilling the fresh liquid tank or draining the used liquid tank, as needed periodically. Refilling the fresh liquid tank may include accessing the fresh liquid tank at a fill box and draining the used liquid tank may include accessing the used liquid tank at a fill box.

The method may include determining a condition of a fresh liquid tank. If the fresh liquid tank needs to be refilled, a service company may be contacted to refill the fresh liquid tank. In addition, the condition of the fresh liquid tank may be determined prior to draining and refilling the cooking apparatus of liquid. A condition of the used liquid tank may also be determined. A service company may be contacted if the used liquid tank should be drained. In addition, the condition of the used liquid tank may be determined before the cooking apparatus is drained and used liquid is attempted to be added to the used liquid tank. The condition of the tanks is desirably determined at a control box connected to the fresh liquid tank and/or used liquid tank.

BRIEF DESCRIPTION OF THE DRAWINGS

These and other features, aspects and advantages of the present invention will become better understood with regard to the following detailed description, appended claims, and accompanying drawings in which:

DETAILED DESCRIPTION

A system for recovering and refilling liquids in accordance with an embodiment of the invention is shown in FIGS. 1–8.

A restaurant includes various cooking apparatus utilizing liquids that should be removed and replaced. One such cooking apparatus 10, as shown schematically in FIG. 1, comprises a food fryer 12, such as the well known deep fryer used in fast food restaurants. The system includes a fresh oil tank 14 and a used oil tank 16, located on the premises for the restaurant. The fresh oil tank 14 has a low level sensor and a high level sensor. The used oil tank 16 has a high level sensor. The used oil tank 16 and/or fresh oil tank 14 may be located within the restaurant building, or outside the building. The fresh oil tank 14 is preferably located within the restaurant building. In the embodiment shown, each tank located within the building is connected to a fill box 18 mounted in an exterior wall of the building, for convenient filling or draining of the tanks. However, the fill box is not essential.

Figure 5:
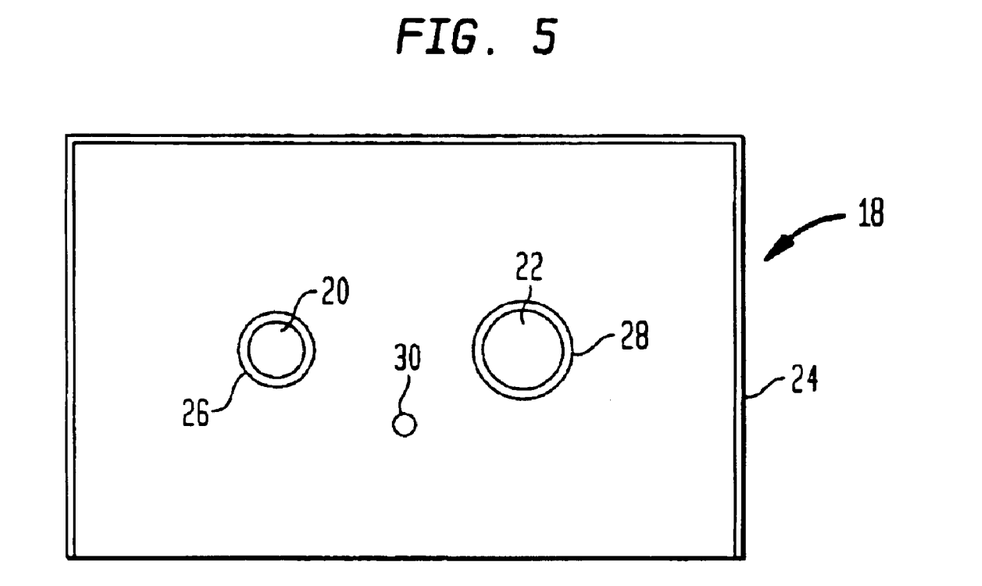
FIG. 5 is a front elevational view of a fill box in accordance with the embodiment of FIGS. 1–4.
Figure 6:
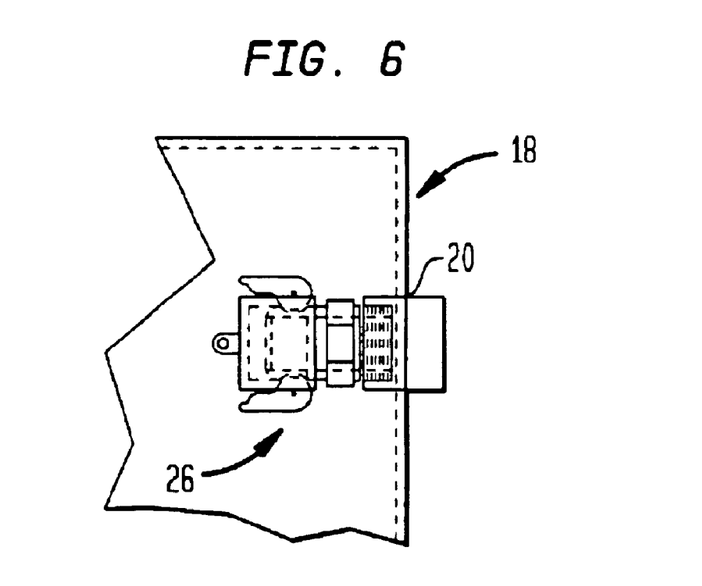
FIG. 6 is a left side elevational view, partially in section, of a coupling for a system in accordance with the embodiment of FIGS. 1–5.

The fill box, best seen in FIG. 5, comprises a first port 20 connected to the used oil tank 16 and a second port 22 connected to the fresh oil tank 14 for providing access to the fresh oil tank 14 and used oil tank 16 from outside the building. The ports communicate from outside the building to the fresh oil tank 14 and used oil tank 16 within the building so that a truck parked outside the restaurant may be used in filling and/or draining the tanks. The fill box 18 comprises a housing 24 having the first port 20 and second port 22 formed therein. The housing 24 carries a first coupling 26 and a second coupling 28 for connecting to the first port 20 and second port 22, respectively. The first coupling 26 and second coupling 28 may comprise stainless steel threaded couplings. The housing 24 also carries an indicator 30 for indicating a condition of the system. The indicator 30 may comprise a display panel, such as an LCD panel, or one or more indicator lights. Preferably, the indicator 30 responds to a condition of the low level sensor and high level sensors for the tanks. For example, the indicator 30 may include a light that is turned on when the low level sensor for the fresh oil tank 14 is tripped, to confirm that the tank 14 needs to be filled. Likewise, a light for the high level sensor on the tank 14 can be used to indicate that the tank 14 is full and a light for the high level sensor for the used oil tank 16 can indicate that the tank 16 should be drained.

The fresh oil tank 14 and the used oil tank 16 are also connected to a pump assembly 32, which has at least one pump for moving the cooking oil from the food fryer 12 to the used oil tank 16 during a draining operation and from the fresh oil tank 14 to the fryer 12 during a filling operation. The pump assembly 32 includes a used oil pump 34 and a fresh oil pump 36. The used oil pump 34 has an outlet 31 for communicating with the used oil tank 16 and an inlet 33 for receiving used oil drained from the fryer 12. The fresh oil pump 36 has an inlet 35 for receiving fresh oil from the fresh oil tank 14 and an outlet 37 for delivering fresh oil to the fryer 12.

Figure 1:
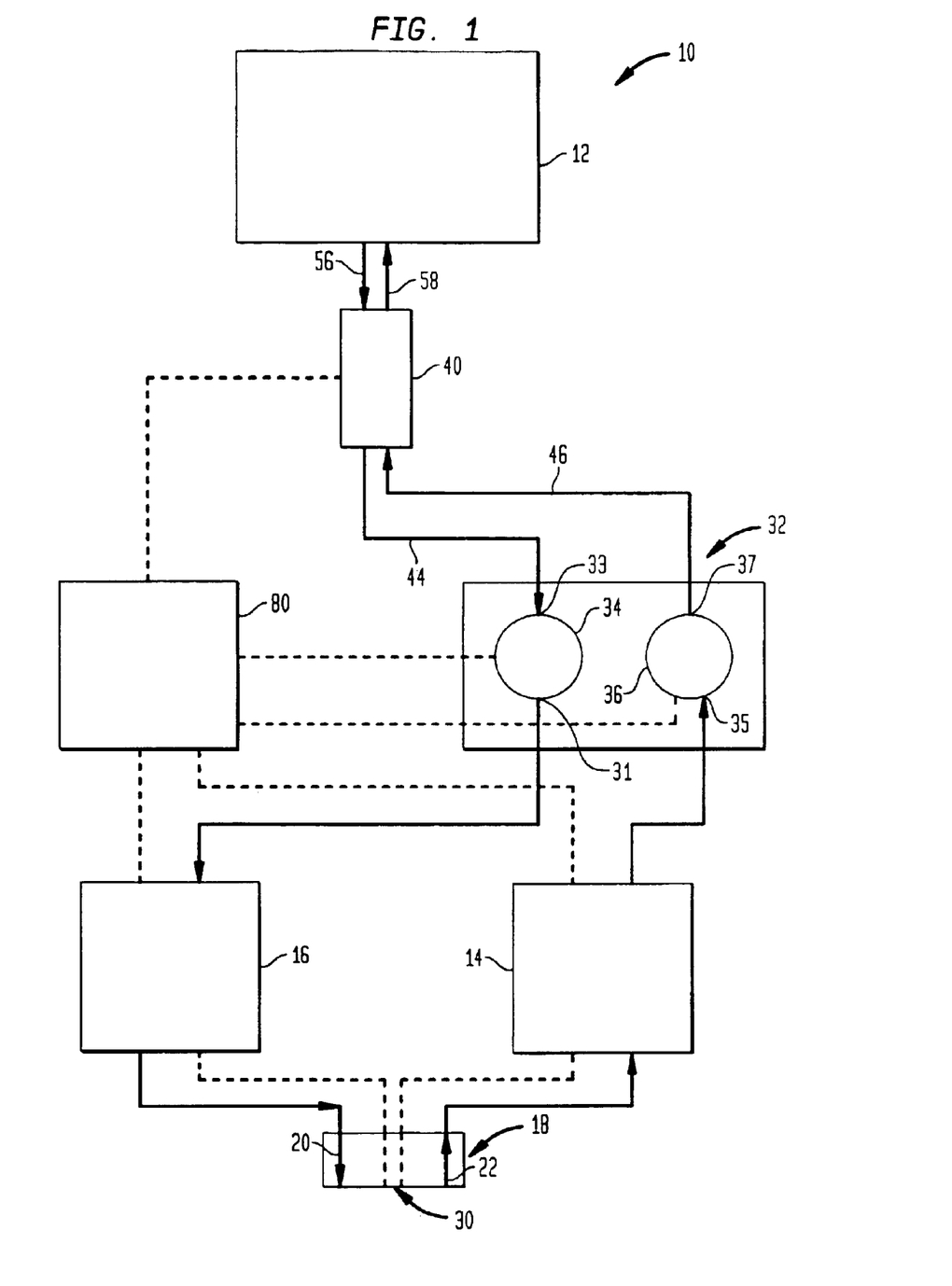
FIG. 1 is a schematic plan view of a system for recovering and refilling liquid in accordance with an embodiment of the invention.
Figure 2:
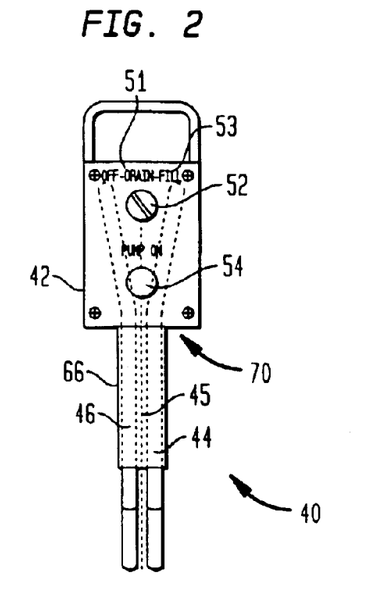
FIG. 2 is a plan view of a nozzle in accordance with the embodiment of FIG. 1.
Figure 3:
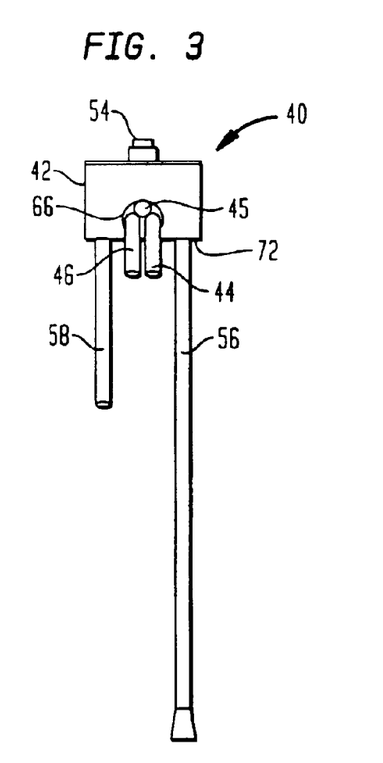
FIG. 3 is a rear elevational view of the nozzle in accordance with the embodiment of FIGS. 1–2.
Figure 4:
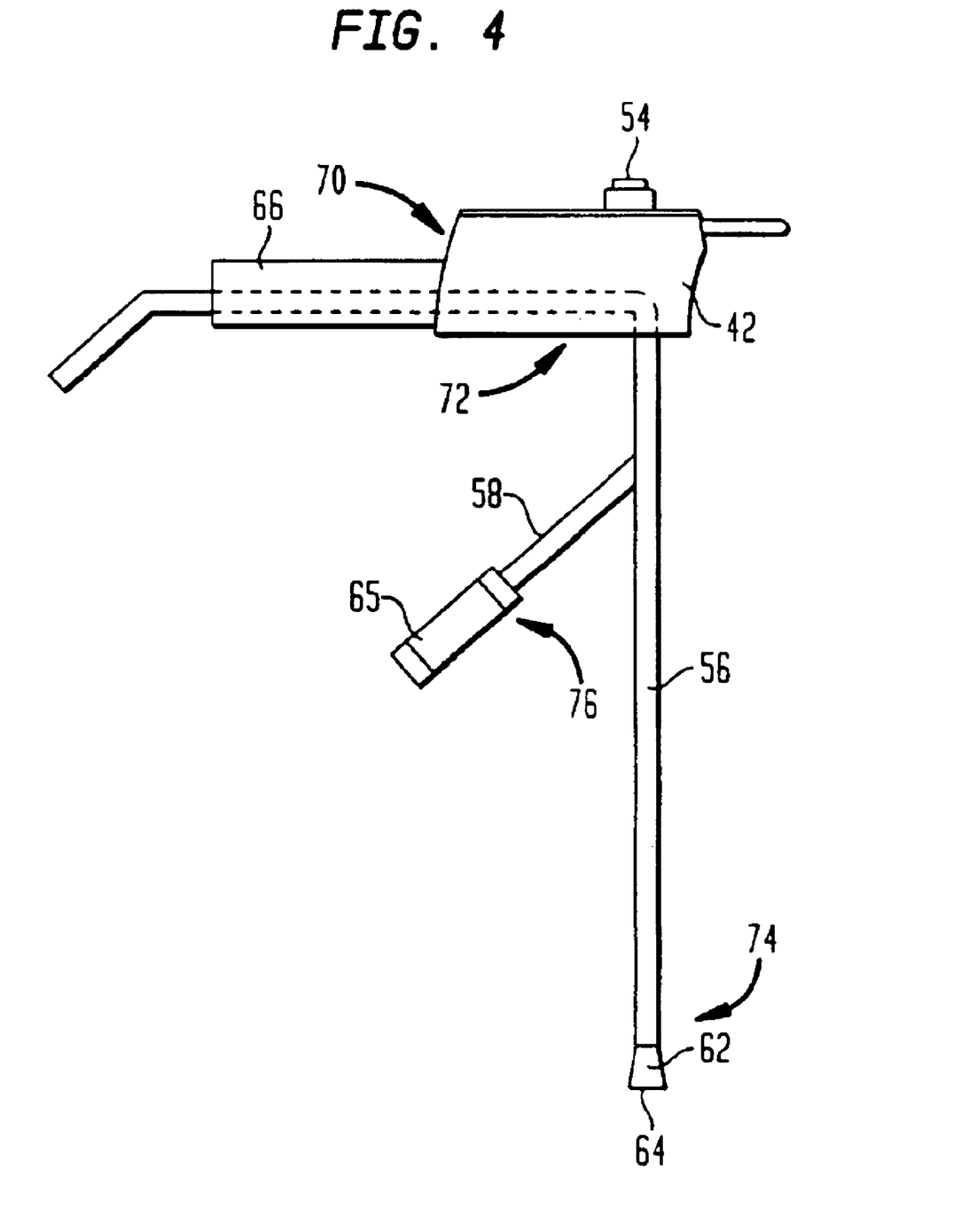
FIG. 4 is a right side elevational view of a nozzle in accordance with the embodiment of FIGS. 1–3.

The inlet 33 of the used oil pump 34 and outlet 37 of the fresh oil pump 36 are connected to a nozzle 40 for draining and refilling the food fryer 12. The nozzle 40, as best seen in FIGS. 2–4, is a separate, hand-held device. The nozzle 40 has a housing 42 that carries a used oil line 44 and fresh oil line 46. The used oil line 44 and fresh oil line 46 extend through an opening in a back end 70 of the housing 42. The used oil line 44 is connected to the inlet 33 of the used oil pump 34 and the fresh oil line 46 is connected to the outlet 37 of the fresh oil pump 36. The fresh oil line and used oil line provide separate paths for used oil and fresh oil. The fresh oil for refilling the cooking apparatus is not contaminated by the used oil drained from the cooking apparatus. The fresh oil line and used oil line may be combined in a single line having a first compartment separated from a second compartment, either having a side-by-side (or upper and lower) arrangement or a coaxial arrangement.

The nozzle 40 has an inlet tube 56 and an outlet tube 58 that extend from a bottom side 72 of the housing 42. The inlet tube 56 has a first end that is attached to the used oil line 44 and the outlet tube 58 has a first end that is connected to the fresh oil line 46, within the housing. As best seen in FIG. 4, the inlet tube 56 extends from the housing 42 to a free end 74, opposite the first end, and to a perforated end cap 62 at the free end 74. The end cap 62 forms an inlet opening 64 for the inlet tube 56, for receiving used oil from the fryer 12 when the inlet tube 56 is inserted into the fryer 12. The end cap 62 may comprise a concentric reducer connected to the free end 74 so that the inlet opening 64 has a greater diameter than the inlet tube 56. The end cap 62 is perforated so that larger residual food and other debris that can clog the system are not drawn into the inlet tube 56 with the used oil. Alternatively or additionally, the inlet opening 64 may carry a wire mesh screen. The nozzle 40 also includes an outlet tube 58 that extends to a free end 76. A check valve 65 is connected to free end 76 for preventing fresh oil from dripping from the outlet tube 58 after the fryer is filled with fresh oil. The check valve 65 may operate mechanically or electrically to close the outlet tube 58. The inlet tube 56 and outlet tube 58 may comprise stainless steel tubes. In addition, the housing, end cap, and valve may comprise stainless steel parts, which are suitable for use with foods and for use with the hot cooking oil to be removed from the fryer.

The housing 42 of the nozzle 40 also carries wiring 45 and one or more switches for actuating the fresh oil pump 36 and used oil pump 34. For example, the wiring 45 is connected to a first switch 48 and a second switch 50. The wiring 45 includes a wire connecting the first switch 48 to the used oil pump 34 so that the first switch 48 activates the used oil pump 34, drawing used oil through the inlet tube 56 and used oil line 44 of the nozzle 40. The wiring 45 also includes a wire connecting the second switch 50 to the fresh oil pump 36 so that the second switch 50 activates the fresh oil pump 36, drawing fresh oil from the fresh oil tank 14 and conveying the fresh oil through the fresh oil line 46 and outlet tube 58. In an embodiment, the nozzle housing 42 carries a selector knob 52 and button 54. The selector knob 52 has a drain position 51 and a fill position 53 and is arranged with the button 54 and the switches to activate the pumps. The selector knob 52 and button 54 are arranged so that when the selector knob 52 is turned to the drain position 51 and the button 54 is pressed, the first switch 48 activates the used oil pump 34. When the selector knob 52 is turned to the fill position 53 and the button 54 is pressed, the second switch 50 activates the fresh oil pump 36. The knob 52 may also have an off position for preventing unintended activation of the pumps.

In a preferred embodiment, a single three position switch is used to actuate the pumps. The switch has a first position for actuating the fresh oil pump 36, a second off position, and a third position for actuating the used oil pump 34. The switch may comprise, for example, a momentary switch, spring-loaded in an off position, so that the operator is required to hold the button 154 for the switch in the "on" position (or, in a three position switch, in one of the "on" positions) to drain or fill the fryer. Schematics of the housing and switches are shown in FIGS. 14A–15B.

The nozzle 40 also includes tubing 66 that is attached to the back end 70 of the housing 42 for carrying the used oil line 44, fresh oil line 46, and wiring 45, which all extend from the back end 70 of the housing 42. The wiring 45 extends from the nozzle housing 42 and substantially follows the used oil line 44 and fresh oil line 46, to prevent entanglement, and for easier use of the nozzle. Preferably, the used oil line 44, fresh oil line 46, and wiring 45 all extend away from the nozzle 40, in substantially the same direction, so that the lines and wiring extending from the nozzle 40 do not interfere with the use of the nozzle. The system may include a mounting for storing the nozzle, as well as the lines and wiring that extend from the nozzle 40. A sufficient length of line and wiring must be provided to allow the nozzle 40 to be removed from a location in which the nozzle 40 is stored, extended to the food fryer 12, and operated to drain and/or fill the food fryer 12.

A control box 80 is mounted adjacent the pump assembly 32 and includes electronics for determining a condition of the system and displaying that information. The control box is also desirably arranged to provide power to the whole system, although the pumps, fill box, and nozzle may all have independent power connections to a conventional wall outlet, battery source or generator. The control box 80 has switches for activating the used oil pump 34 and fresh oil pump 35. The control box 80 has buttons and switches associated with each of the pumps so that pressing a button operates a switch and activates one of the pumps. The wiring 45 from the nozzle 40 extends to the control box 80 and from the control box to the pumps. Control box 80 may be used to perform the draining and/or filling operations or may be used to prevent operation of the pumps from the nozzle, for safety or control purposes. In a preferred embodiment, the control box incorporates an electronic timer or other timer device arranged with the switches for operating the pumps so that after the operator switches the used oil pump off, the pump continues to operate for a predetermined amount of time to clear the used oil line 44. A similar timing feature may be provided for the filling operation. The electronic timer may also be provided in the nozzle or on electronics associated with the pumps.

The control box 80 has a control box indicator 82 and wiring connecting the control box indicator 82 to the fresh oil tank 16 low level sensor and/or the used oil tank 14 high level sensor. The indicator 82 preferably comprises a display for displaying the activation of the low level sensor, indicating a need to fill the fresh oil tank 16 with fresh oil, and the activation of the high level sensor, indicating a need to drain the used oil tank 14. If a fill box is used, a service company can be contacted when the indicator shows the need for service. A service truck connects to the first port 20 to drain the used oil tank 14 and connects to the second port 22 to fill the fresh oil tank 14.

Wiring extends from the control box 80 to electronic components of the fresh oil pump 36 and used oil pump 34. The control box 80 is preferably mounted adjacent the pump housing 32 or the wiring 45 from the nozzle 40 is routed so as to avoid entanglement or tripping. The control box 80 preferably includes switches for operating the pumps, and indicators for indicating the condition of the pumps, and indicating the condition of the tanks in the system. The control box 80 may be mounted on an interior wall of the restaurant, preferably near the food fryer 12. In a preferred embodiment, the control box 46 is connected to the nozzle 40 and electrically interconnects the nozzle 40 with the electronic components for the used oil pump 34 and the fresh oil pump 36.

Many known components and materials may be used in designing and building a system in accordance with the present invention. The various parts of the system which come into contact with hot oil should be selected to withstand the temperature of the oil at cooking temperatures, which may be 300° to 350° F. or more. In addition, the various parts of the system which come into contact with oil that is to be used in cooking food should comprise food grade materials. For example, the nozzle housing, inlet tube, outlet tube, end cap and check valve may comprise stainless steel parts. These parts may be cast in shape or welded or otherwise joined together from pre-formed parts. The used oil line 44 and fresh oil line 46 preferably comprise flexible line from food grade materials. These lines may comprise silicone tubes. The conduits that interconnect the pumps and tanks also preferably comprise material designed to withstand hot oil temperatures and/or food grade materials, as appropriate. For example, the conduits connecting the second port 22 with the fresh oil tank 14 and fresh oil pump 36 may comprise polyvinyl chloride (PVC). The conduits connecting the used oil pump 34, used oil tank 16 and first port 20 may comprise silicone. The sizes of the conduits, tanks and pumps are selected depending upon the size of the cooking apparatus 10, the size of restaurant, or other factors. A person of ordinary skill in the art can select the appropriate size conduits and pumps. Tanks for storing fresh oil and used oil in restaurants are available in various sizes.

FIGS. 1–8 show a system for use in recovering and refilling cooking oil at restaurants in accordance with an embodiment of the invention. A system in accordance with other embodiments of the present invention may be used to recover and replenish cooking oil or other liquids in food processing plants, for example. However, a system in accordance with embodiments of the present invention may be used to recover and refill other liquids in other contexts.

Figure 7:
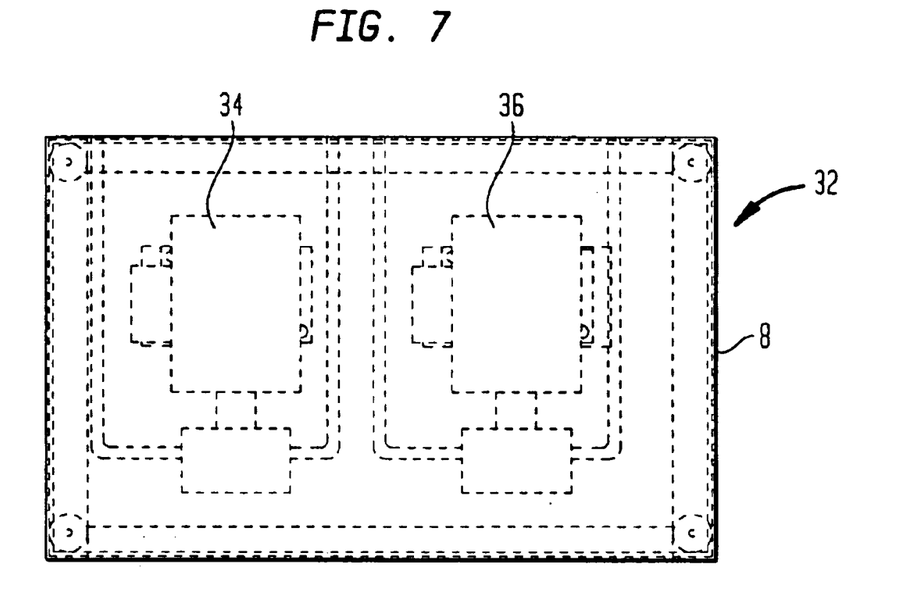
FIG. 7 is a plan view of a pump housing for the system in accordance with the embodiment of FIGS. 1–6.
Figure 8:
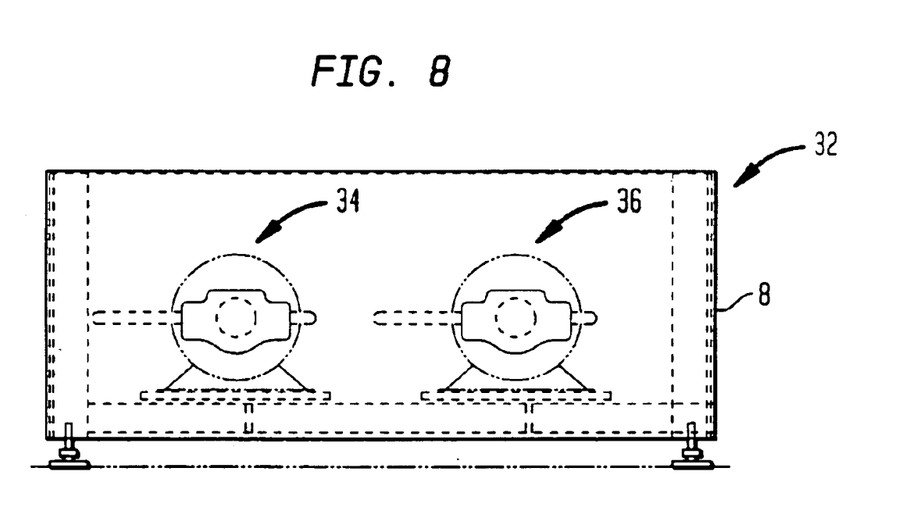
FIG. 8 is an elevational view for the pump housing of FIG. 6 in accordance with the embodiment of FIGS. 1–7.
Figure 9:
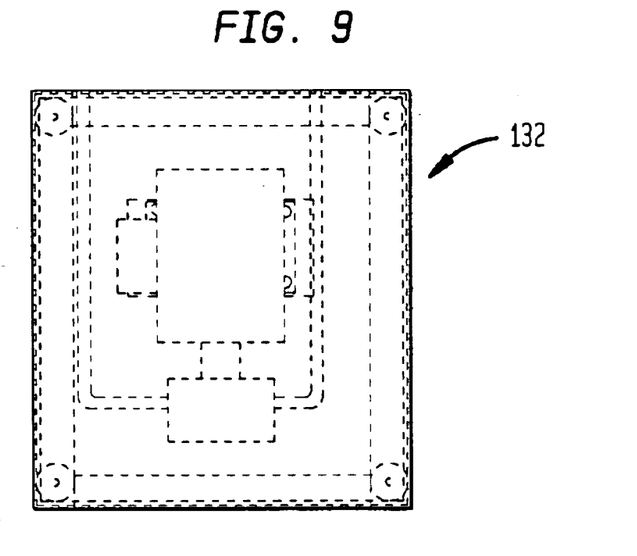
FIG. 9 is a plan view of a pump housing in accordance with a further embodiment of the invention.
Figure 10:
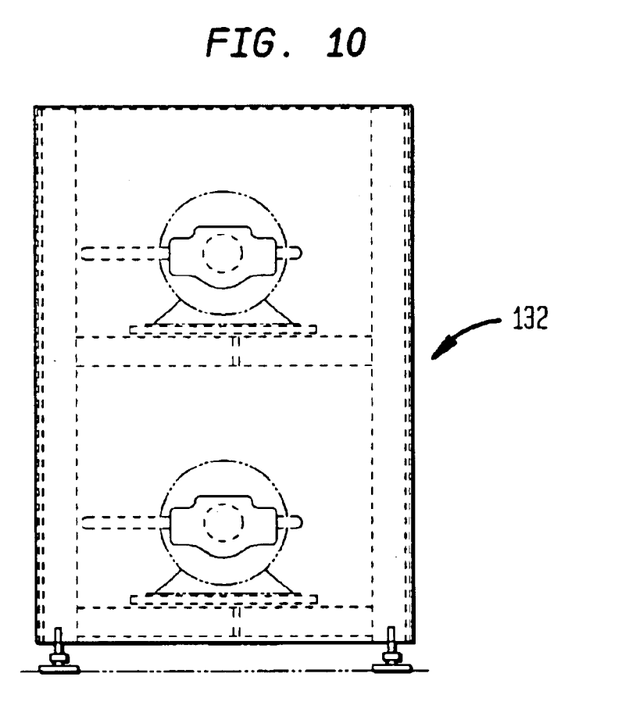
FIG. 10 is an elevational view for a pump housing in accordance with the embodiment of FIG. 9.
Figure 11:
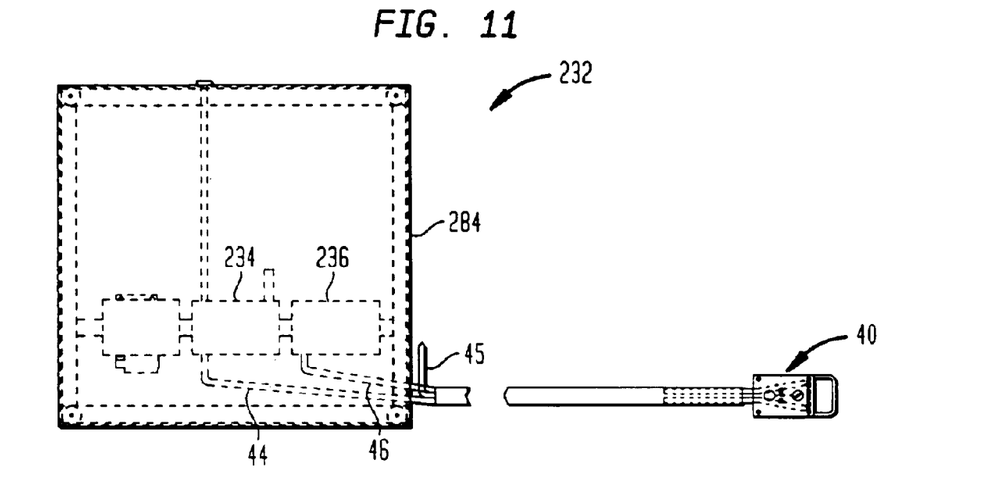
FIG. 11 is a plan view of a pump and tank housing in accordance with a further embodiment of the invention.
Figure 12:
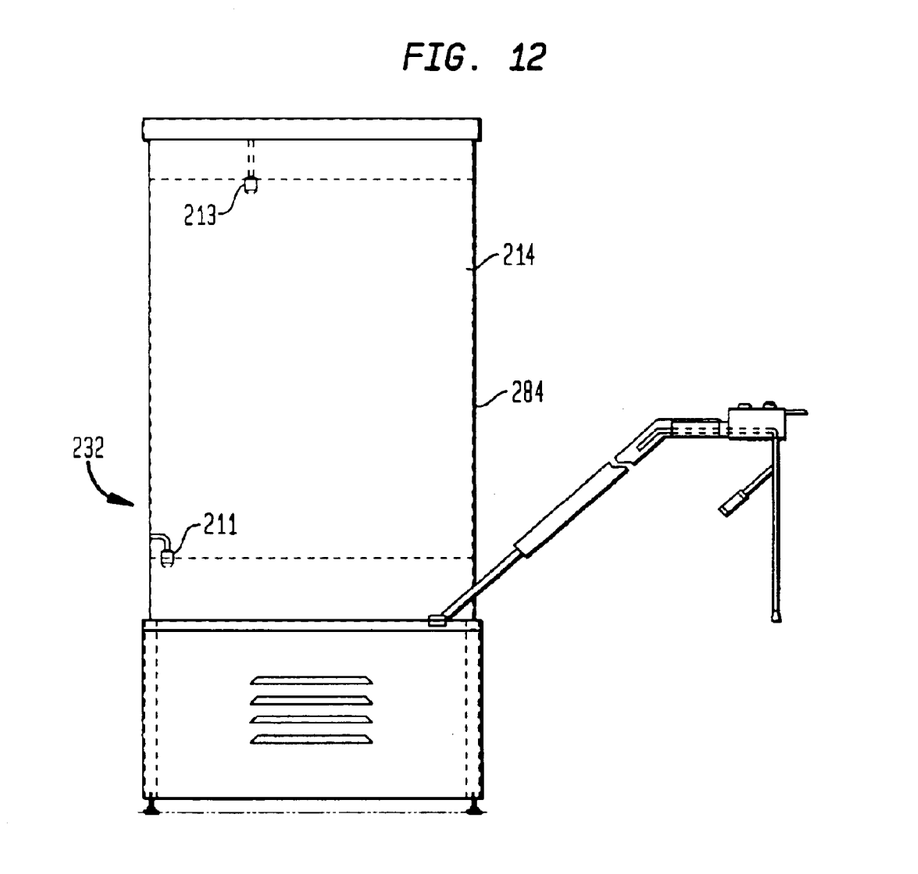
FIG. 12 is an elevational view of a pump and tank housing in accordance with the embodiment of FIG. 11.
Figure 13:
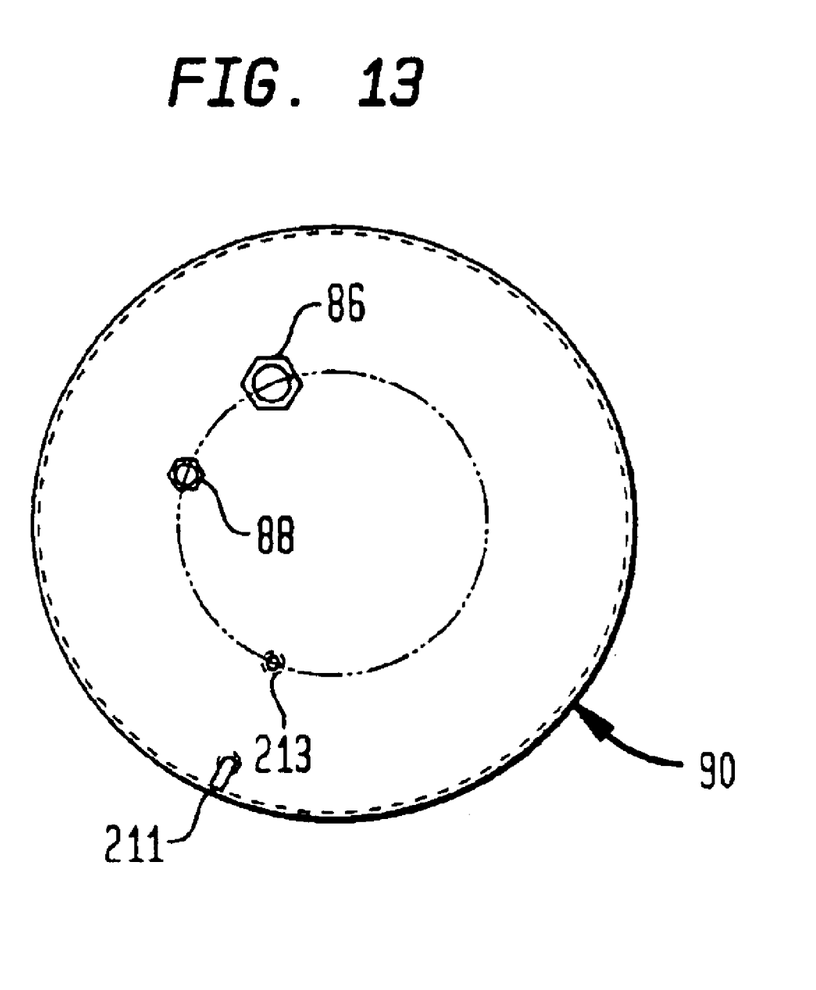
FIG. 13 is a top plan view of a tank in a system in accordance with the embodiment of FIGS. 11–13.
Figure 14A:
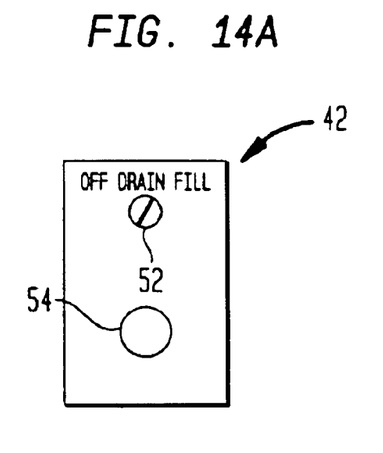
FIG. 14A is a schematic view of a nozzle housing in accordance with an embodiment of the invention.
Figure 14B:
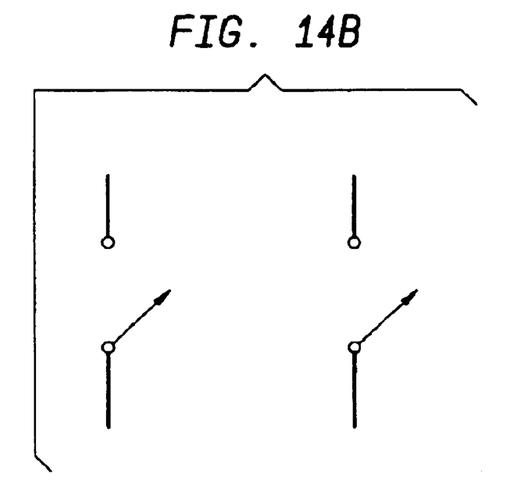
FIG. 14B is a schematic of a first switch and second switch for the embodiment of FIG. 14A.
Figure 15A:
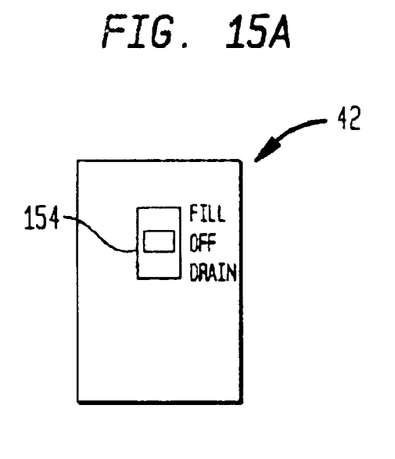
FIG. 15A is a schematic view of a nozzle housing in accordance with a further embodiment of the invention.
Figure 15B:
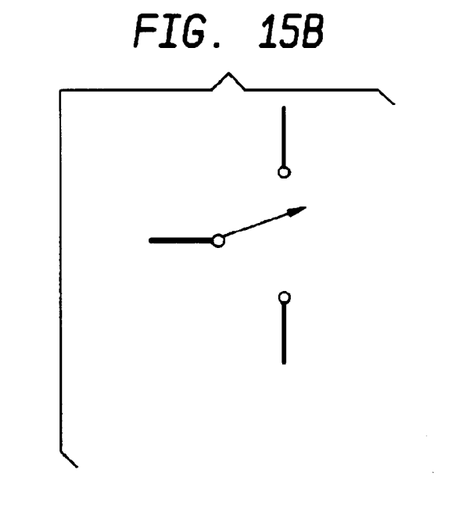
FIG. 15B is a schematic of a switch for the embodiment of FIG. 15A.

An assembly for the pumps in accordance with an embodiment of the invention is shown in FIGS. 7 and 8. In this embodiment, the fresh oil pump 36 and used oil pump 34 are mounted within a housing 84, side by side. In a further embodiment, as shown in FIGS. 9 and 10, the pumps may be mounted one above the other. Depending upon the configuration of the restaurant or other building in which a system in accordance with an embodiment of the invention is used, the pump assembly in FIGS. 7 and 8 may be used, allowing the top of the housing to be used as a counter top. In other contexts, the pump assembly 132 shown in FIGS. 9 and 10 may be used, as where the horizontal space for the side by side arrangement is not available. In a further embodiment, as shown in FIGS. 11 and 12, the fresh oil tank 214 is mounted within the housing 284 for the pump assembly 232. The used oil tank is located elsewhere on the premises. As shown in FIG. 12, the tank 214 includes a high level sensor 213 and a low level sensor 211. The fresh oil line 46 and used oil line 44 of the nozzle 40 is received in an opening in the housing 284 and is connected to the fresh oil pump 236 and used oil pump 234 within the housing 284. As shown in FIG. 13, the top of the tank may include a fill connection 86, a vent 88 and a drain connection 90 for filling and draining the tank. In other embodiments, the tank is connected to a fill box, as described above. In one example, a tank of high density polyethylene (HDPE) of about a 150 gallon capacity may be used for a restaurant. However, the size of the tank will depend upon the particular context. For example, where the system is used in a restaurant, the volume of fried food produced by the restaurant and the volume of oil used will determine the size of the tank. Preferably, each of the housings shown in FIGS. 7–13 include leveling legs to ensure optimal performance of the pumps.

Although the invention herein has been described with reference to particular embodiments, it is to be understood that these embodiments are merely illustrative of the principles and applications of the present invention. For example, separate pumps for the draining and filling operations are not essential. Embodiments in accordance with the present invention include a reversible pump for draining and filing, as well as appropriate fixtures, piping, and/or valves to connect the reversible pump to the used oil tank during draining and to fresh oil tank during filling. A filter or filtering apparatus may be used to treat the liquid on the premises. In addition, the control box may be omitted and the nozzle may include electronics for interfacing with the pump or pumps directly. The indicators and sensors may be configured for the needs of the particular restaurant. Some sensors and indicators may be omitted or additional ones may be included. The nozzle may have a shape that is different than the nozzle shown, for aesthetic or functional purposes. For example, the nozzle may include an ergonomic handle. The inlet tube and/or the outlet tube may extend from a front end of the nozzle housing. It is therefore to be understood that numerous modifications may be made to the illustrative embodiments and that other arrangements may be devised without departing from the spirit and scope of the present invention as defined by the appended claims.

What is claimed is:

1. A system for draining used cooking oil and refilling fresh cooking oil of a cooking fryer, comprising:
    (a) a cooking fryer;
    (b) a fresh oil tank;
    (c) a used oil tank;
    d) at least one pump for delivering fresh oil to the cooking fryer and for draining used oil from the cooking fryer;
    e) a nozzle capable of being held in the hand of an operator of said system, having a fresh oil line and a used oil line, said used oil line being separate from said fresh oil line; and
    (f) piping connecting the fresh oil tank, used oil tank, the at least one pump, and the nozzle.

2. The system of claim 1, further comprising a fill box having at least one port for communicating from an exterior side of a building to an interior side of the building.

3. The system of claim 2, wherein said fill box includes a first port connected to said used oil tank and a second port connected to said fresh oil tank.

4. The system of claim 1, wherein said at least one pump comprises:
    (a) a used oil pump including an outlet in communication with said used oil tank; and
    (b) a fresh oil pump having an inlet in communication with said fresh oil tank.

5. The system of claim 1, further comprising a control box connected to said at least one pump for actuating said at least one pump in draining and refilling the cooking fryer.

6. The system of claim 1, wherein said nozzle has an actuator connected to said at least one pump for draining and refilling the cooking fryer.

7. The system of claim 1, wherein said piping includes a material for conveying hot cooking oil.

8. The system of claim 7, wherein said piping includes a food grade material.

9. The system of claim 6, wherein said actuator comprises:
    (a) a first switch in communication with a fresh oil pump; and
    (b) a second switch in communication with said used oil pump.

10. The system of claim 6, wherein said actuator comprises at least one switch for actuating a fresh oil pump and a used oil pump.

11. A method of draining and refilling cooking oils in a cooking fryer, comprising:
    (a) inserting an inlet of a nozzle, capable of being held in the hand of an operator, into the cooking fryer;
    (b) actuating a used oil pump in communication with said nozzle through a used liquid line;
    (c) actuating a fresh oil pump in communication with said nozzle through a fresh oil line, wherein said fresh oil line is separate from said used oil line, said fresh oil pump directing fresh oil to the cooking fryer.

12. The method of claim 11, further comprising selecting between a draining mode and a refilling mode of the nozzle.

13. The method of claim 12, wherein the selecting comprises selecting between actuation of a used oil pump and a fresh oil pump.

14. The method of claim 4, further comprising determining a condition of a fresh oil tank.

15. The method of claim 4, further comprising determining a condition of a used oil tank.

16. The method of claim 14, further comprising refilling the fresh oil tank.

17. The method of claim 15, further comprising draining the used oil tank.

18. The method of claim 16, wherein the step of refilling includes accessing the fresh oil tank at a fill box.

19. The method of claim 17, wherein the step of draining includes accessing the used oil tank at a fill box.

20. An apparatus for draining and refilling cooking oil from a cooking fryer comprising:
    (a) a housing capable of being held in the hand of an operator of said cooking fryer;
    b) a fresh oil line carried by said housing and having an outlet for dispensing fresh oil;
    c) a used oil line carried by said housing and having an inlet for receiving used oil;
    d) an inlet tube connected to said used oil line and an outlet tube connected to said fresh oil line; and
    e) a screen disposed in the free end of said inlet tube.

21. The apparatus of claim 20, further comprising an end cap connected to the free end of said inlet tube, said end cap carrying said screen.

22. The apparatus of claim 20, further comprising a check valve connected to the free end of said outlet tube.

23. An apparatus for draining and refilling cooking oil from a cooking fryer comprising:
    (a) a housing capable of being held in the hand of an operator of said cooking fryer;
    (b) a fresh oil line carried by said housing and having an outlet for dispensing fresh oil;
    (c) a used oil line carried by said housing and having an inlet for receiving used oil;
    d) an inlet tube connected to said used oil line and an outlet tube connected to said fresh oil line; and
    e) a check valve connected to the free end of said outlet tube.

24. A nozzle for draining and refilling cooking oil from a cooking fryer comprising:
    (a) a housing capable of being held in the hand of an operator of said cooking fryer;
    (b) a fresh oil line carried by said housing and having an outlet for dispensing fresh oil;
    (c) a used oil line, which is separate from said fresh oil line, is carried by said housing and has an inlet for receiving used oil; and
    (d) at least one actuator carried by said housing for actuating at least one pump;
    wherein the at least one actuator comprises a first switch for actuating a first pump and a second switch for actuating a second pump.

25. The nozzle of claim 24, wherein said fresh oil line and said used oil line comprise flexible tubing for communicating with at least one pump.

26. The nozzle of claim 25, further comprising wiring connected to said at least one switch and extending from said housing.

27. The nozzle of claim 26, further comprising tubing attached to said housing, said wiring, fresh oil line, and said used oil line extending from said housing through said tubing.

28. The nozzle of claim 27, further comprising:
    a selector knob for selecting said first switch or said second switch; and
    a button for actuating a selected one of said first switch and said second switch.

29. A nozzle for draining and refilling cooking oil from a cooking fryer comprising:
   (a) a housing capable of being held in the hand of an operator of said cooking fryer;
   (b) a fresh oil line carried by said housing and having an outlet for dispensing fresh oil;
   (c) a used oil line, which is separate from said fresh oil line, is carried by said housing and has an inlet for receiving used oil;
   (d) an inlet tube connected to said used oil line and an outlet tube connected to said fresh oil line; and
   (e) an end cap connected to a free end of said inlet tube, said end cap carrying a screen;
   wherein said used oil line and said fresh oil line comprise flexible tubes and said inlet tube and said outlet tube comprise rigid tubing.

30. The nozzle of claim 29, further comprising a shut-off valve connected to a free end of said outlet tube.

31. The nozzle of claim 30, wherein the shut-off valve comprises a check valve.

32. The nozzle of claim 29, wherein said inlet tube and said used oil line comprise a material for conveying hot cooking oil.

33. The nozzle of claim 32, wherein said outlet tube and fresh oil line comprise food grade materials.

34. The nozzle of claim 29, wherein said inlet tube and outlet tube are comprised of stainless steel tubes.

35. The nozzle of claim 34, wherein said fresh oil line and said used oil line comprise silicon tubes.

36. A nozzle for draining and refilling cooking oil from a cooking fryer comprising:
   (a) a housing capable of being held in the hand of an operator of said cooking fryer;
   (b) a fresh oil line carried by said housing and having an outlet for dispensing fresh oil;
   c) a used oil line, which is separate from said fresh oil line, is carried by said housing and has an inlet for receiving used oil;
   (d) an inlet tube connected to said used oil line and an outlet tube connected to said fresh oil line; and
   (e) a shut-off valve connected to a free end of said outlet tube;
   wherein said used oil line and said fresh oil line comprise flexible tubes and said inlet tube and said outlet tube comprise rigid tubing.

37. The nozzle of claim 36, wherein the shut-off valve comprises a check valve.

38. The nozzle of claim 36, wherein said inlet tube and said used oil line comprise a material for conveying hot cooking oil.

39. The nozzle of claim 38, wherein said outlet tube and fresh oil line comprise food grade aterials.

40. The nozzle of claim 36, wherein said inlet tube and outlet tube are comprised of stainless steel tubes.

41. The nozzle of claim 36, wherein said fresh oil line and said used oil line comprise silicon tubes.

* * * * *

UNITED STATES PATENT AND TRADEMARK OFFICE
CERTIFICATE OF CORRECTION

PATENT NO. : 6,792,983 B2  Page 1 of 1
DATED : September 21, 2004
INVENTOR(S) : Michael Allora It is certified that error appears in the above-identified patent and that said Letters Patent is hereby corrected as shown below:

Column 4,
Line 66, delete "claim 4" and insert -- claim 11 --.

Column 9,
Line 64, delete "claim 4" and insert -- claim 11 --.

Column 12,
Line 24, delete "aterials" and insert -- materials --.

Signed and Sealed this

Nineteenth Day of April, 2005

JON W. DUDAS
*Director of the United States Patent and Trademark Office*